(12) United States Patent
Xia

(10) Patent No.: US 12,504,112 B1
(45) Date of Patent: Dec. 23, 2025

(54) DISPLAY EQUIPMENT FIXING TRAY

(71) Applicant: Wenjie Xia, Suizhou (CN)

(72) Inventor: Wenjie Xia, Suizhou (CN)

( * ) Notice: Subject to any disclaimer, the term of this patent is extended or adjusted under 35 U.S.C. 154(b) by 0 days.

(21) Appl. No.: 18/886,760

(22) Filed: Sep. 16, 2024

(51) Int. Cl.
 *F16M 11/10* (2006.01)
 *F16M 11/20* (2006.01)
 *F16M 13/02* (2006.01)

(52) U.S. Cl.
 CPC ......... *F16M 11/10* (2013.01); *F16M 11/2014* (2013.01); *F16M 13/02* (2013.01)

(58) Field of Classification Search
 CPC .............................. F16M 13/02; F16M 11/10
 USPC ...................... 248/284.1, 324, 923
 See application file for complete search history.

(56) References Cited

U.S. PATENT DOCUMENTS

| | | | | |
|---|---|---|---|---|
| 4,566,663 | A * | 1/1986 | Barchus | F16M 11/14 248/921 |
| 7,389,963 | B2 * | 6/2008 | Cho | F16M 11/28 248/917 |
| 7,832,058 | B2 * | 11/2010 | Wang | H04M 1/0212 16/303 |
| 11,293,584 | B2 * | 4/2022 | Kleist | F16M 11/10 |
| 11,425,829 | B2 | 8/2022 | Zheng et al. | |
| 11,996,604 | B2 * | 5/2024 | Lapalme | H01Q 1/1242 |
| 12,173,842 | B2 * | 12/2024 | Morrison | F16M 13/027 |
| 2006/0261228 | A1 * | 11/2006 | Hung | F16M 13/022 248/282.1 |
| 2010/0074681 | A1 * | 3/2010 | Jamalzadeh | A61B 90/50 439/211 |
| 2011/0121151 | A1 * | 5/2011 | Stifal | G06F 1/1601 248/343 |
| 2014/0367137 | A1 * | 12/2014 | Leung | F16M 11/2014 174/68.3 |

* cited by examiner

*Primary Examiner* — Bradley Duckworth
(74) *Attorney, Agent, or Firm* — Che-Yang Chen; Law Office of Michael Chen

(57) ABSTRACT

A display equipment fixing tray may include a clamping base and a mounting base, a counter bolt is installed on the top of the clamping base, the other end of the counter bolt is located inside the mounting base, a fixing tube is fixedly installed on the side wall of the mounting base, a fixing hole is provided on the inner wall of the fixing tube, the clamping base is in an inverted concave shape, and a mounting hole is provided on the side wall of the clamping base. The present invention is provided with a fixing tube, the fixing tube can be inserted into the fixing hole through the connecting bolt, so that the display equipment can be installed on the fixing tube through the connecting bolt, thereby ensuring the installation of the display equipment and ensuring its stability.

1 Claim, 6 Drawing Sheets

DISPLAY EQUIPMENT FIXING TRAY

FIELD OF THE INVENTION

The invention relates to the technical field of display equipment fixing, and in particular to a display equipment fixing tray.

BACKGROUND OF THE INVENTION

With the advancement of technology, flat panel displays have almost completely replaced cathode ray tube displays and become the mainstream of today's display technology. Compared with the bulky size of traditional cathode ray tube displays, flat panel displays have the characteristics of low power consumption, low radiation, and thinness in size.

However, the display equipment fixing bracket of prior arts are often used to fix the display on the wall or install it on the desktop, which is impossible to effectively control it under specific conditions, such as the front end of a treadmill. At the same time, when the display equipment needs to be adjusted the angles of left and right, as well as up and down, it cannot be adjusted according to autonomous needs, resulting in many limitations on the use of existing display equipment fixing tray.

Therefore, the present invention provides a display equipment fixing tray to solve the above problems.

SUMMARY OF THE DISCLOSURE

In view of the above situation, in order to overcome the shortcomings of the prior arts, the present invention provides a display equipment fixing tray to solve the above problem of insufficient applicability and inconvenience in adjusting the angles of left, right, as well as up and down mentioned above.

In order to achieve the above objects, the present invention provides the following technical solutions:

A display equipment fixing tray comprises a clamping base and a mounting base, a counter bolt is installed on the top of the clamping base, the other end of the counter bolt is located inside the mounting base, a fixing tube is fixedly installed on the side wall of the mounting base, a fixing hole is opened on the inner wall of the fixing tube, the clamping base is in an inverted concave shape, a mounting hole is opened on the side wall of the clamping base, and a sleeve is sleeved on the outer wall of the counter bolt. Through the setting of the fixing tube, the fixing tube can be inserted into the fixing hole by the connecting bolt, so that the display equipment can be installed on the fixing tube through the connecting bolt, thereby ensuring the installation of the display equipment and ensuring its stability. The installation and disassembly of the display equipment is simple and convenient, and the display equipment can be installed on the treadmill and other equipment through the clamping base to achieve versatile installation.

Preferably, an adjusting nut is threadedly connected to the outer wall of the counter bolt, and the adjusting nut is located on the inner top wall of the clamping base.

Preferably, a first gasket and a second gasket are respectively installed at the upper and lower ends of the top of the clamping base, the top wall of the first gasket abuts against the inner top wall of the clamping base, the bottom wall of the first gasket abuts against the top wall of the adjusting nut, the top wall of the second gasket abuts against the bottom wall of the sleeve, and the bottom wall of the second gasket abuts against the upper surface of the top of the clamping base. The present device can be installed on the treadmill by clamping base through the clamping bolts, and the overall installation of the display equipment is realized through the clamping base and the fixing tube.

Preferably, a third gasket is installed on the bottom wall of the mounting base, and the bottom wall of the third gasket abuts against the top wall of the sleeve.

Preferably, a mounting groove is provided on the inner wall of the mounting base, a convex is fixedly installed on the end of the adjusting nut away from the clamping base, the convex is located inside the mounting groove, a compression gasket is installed at the lower part of the convex, and the bottom wall of the compression gasket abuts against the inner bottom wall of the mounting groove. After the display equipment is installed on the present invention, the adjusting nut can be rotated to loosen the counter bolt and the mounting base, so that the mounting base can adjust the left and right angles of the display equipment. At the same time, the connecting bolts between the fixing hole and the display equipment can be loosened, so that the display equipment can be rotated inside the fixing hole to adjust the up and down angles. In this way, the fixing tray of the present invention can meet the requirements of different angles and installation positions.

The beneficial effects of the present invention are:
1. The present invention is provided with a fixing tube, the fixing tube can be inserted into the fixing hole by the connecting bolt, so that the display equipment can be installed on the fixing tube through the connecting bolt, thereby ensuring the installation of the display equipment and ensuring its stability. The installation and disassembly of the display equipment is simple and convenient, and the display equipment can be installed on the treadmill and other equipment through the clamping base to achieve versatile installation.
2. After the display equipment is installed on the present invention, the adjusting nut can be rotated to loosen the counter bolt and the mounting base, so that the mounting base can adjust the left and right angles of the display equipment. At the same time, the connecting bolts between the fixing hole and the display equipment can be loosened, so that the display equipment can be rotated inside the fixing hole to adjust the up and down angles. In this way, the fixing tray of the present invention can meet the requirements of different angles and installation positions.

DETAILED DESCRIPTION OF THE PREFERRED EMBODIMENTS

Other features, objects and advantages of the present invention will be more clearly and completely by the detailed description of the non-limiting embodiments with reference to the attached drawings (FIG. 1 to FIG. 6). Obviously, the described embodiments are only part of the embodiments of the present invention, but not all of them. Based on the embodiments of the present invention, all other embodiments obtained by ordinary technicians in the field without creative labor are within the scope of the present invention.

Figure 1:
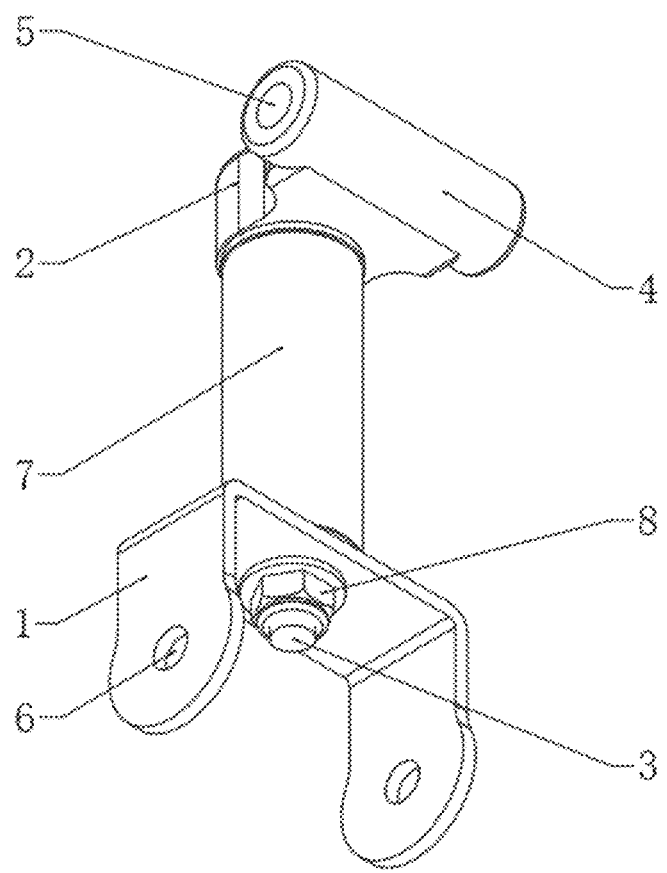
FIG. 1 is a perspective view of the present invention.
Figure 2:
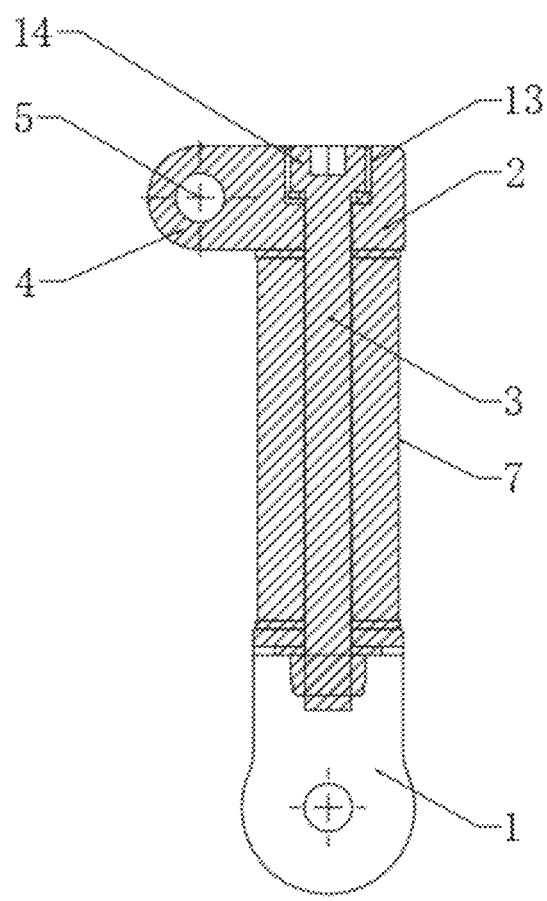
FIG. 2 is a schematic plane view of the side cross-sectional of the present invention.
Figure 3:
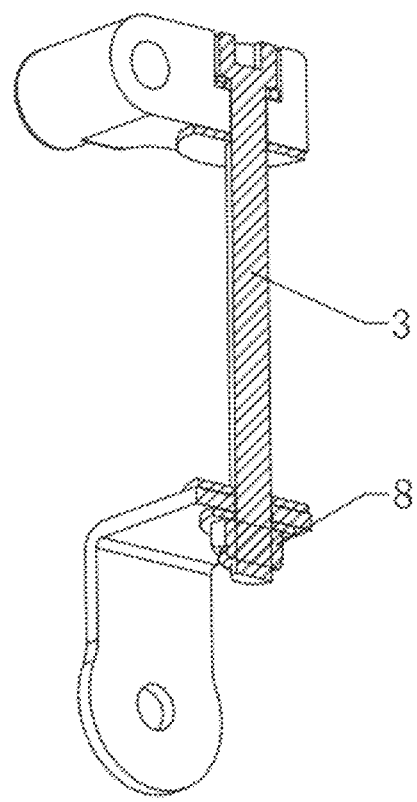
FIG. 3 is a schematic perspective view of the side cross-sectional of the present invention.

A display equipment fixing tray, as shown in FIGS. 1-3, includes a clamping base 1 and a mounting base 2, a counter bolt 3 is installed on the top of the clamping base 1, the other end of the counter bolt 3 is located inside the mounting base 2, a fixing tube 4 is fixedly installed on the side wall of the mounting base 2, a fixing hole 5 is opened on the inner wall of the fixing tube 4, the clamping base 1 is in an inverted concave shape, a mounting hole 6 is opened on the side wall of the clamping base 1, and a sleeve 7 is sleeved on the outer wall of the counter bolt 3. Through the setting of the fixing tube 4, the fixing tube 4 can be inserted into the fixing hole 5 by the connecting bolt, so that the display equipment can be installed on the fixing tube 4 by the connecting bolt, thereby ensuring the installation of the display equipment and ensuring its stability. The installation and disassembly of the display equipment is simple and convenient, and the display equipment can be installed on a treadmill and other equipment through the clamping base 1 to achieve versatile installation.

Figure 4:
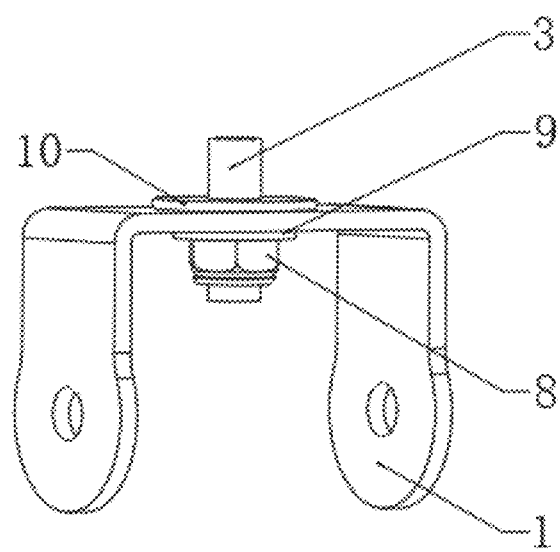
FIG. 4 is a perspective view of a clamping base of the present invention.

As shown in FIGS. 3-4, an adjusting nut 8 is threadedly connected to the outer wall of the counter bolt 3, and the adjusting nut 8 is located on the inner top wall of the clamping base 1.

As shown in FIG. 4, the first gasket 9 and the second gasket 10 are respectively installed at the upper and lower ends of the top of the clamping base 1, the top wall of the first gasket 9 abuts against the inner top wall of the clamping base 1, the bottom wall of the first gasket 9 abuts against the top wall of the adjusting nut 8, the top wall of the second gasket 10 abuts against the bottom wall of the sleeve 7, and the bottom wall of the second gasket 10 abuts against the upper surface of the top of the clamping base 1. The present device can be installed on the treadmill by clamping base 1 through the clamping bolts, and the overall installation of the display equipment is realized through the clamping base 1 and the fixing tube 4.

Figure 5:
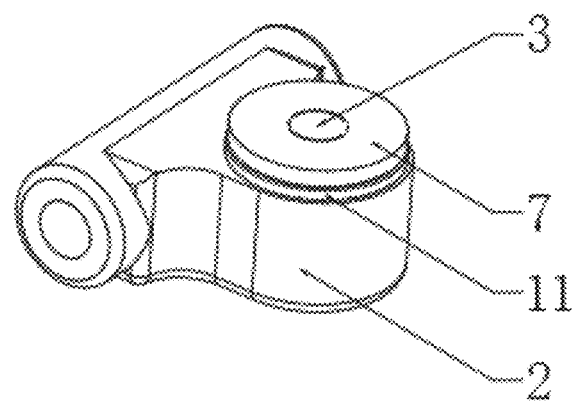
FIG. 5 is a perspective view of the mounting base of the present invention.
Figure 6:
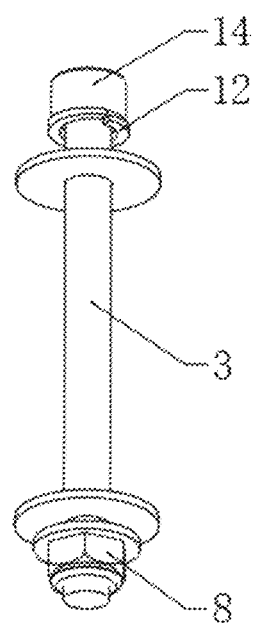
FIG. 6 is a perspective view of the counter bolt of the present invention.

As shown in FIGS. 5-6, a third gasket 11 is installed on the bottom wall of the mounting base 2, and the bottom wall of the third gasket 11 abuts against the top wall of the sleeve 7.

As shown in FIGS. 2 and 6, a mounting groove 13 is provided on the inner wall of the mounting base 2, a convex 14 is fixedly installed at the end of the adjusting nut 8 away from the clamping base 1, the convex 14 is located inside the mounting groove 13, a compression gasket 12 is installed at the lower part of the convex 14, and the bottom wall of the compression gasket 12 abuts against the inner bottom wall of the mounting groove 13. After the display equipment is installed on the present invention, the adjusting nut 8 can be rotated to loosen the counter bolt 3 and the mounting base 2, so that the mounting base 2 can adjust the left and right angles of the display equipment. At the same time, the connecting bolts between the fixing hole 5 and the display equipment can be loosened, so that the display equipment can be rotated inside the fixing hole 5 to adjust the up and down angles. In this way, the fixing tray of the present invention can meet the requirements of different angles and installation positions.

In the present invention, the use of orientation words such as "top", "bottom", "outer", "inner", "left", "right" are only for the convenience of description, rather than indicating or implying the specific orientation, therefore it should not be construed as being limited to the description of the following embodiments. In addition, it should be noted that the terms "first", "second", "third" and the like in the description and claims of the present invention and the above drawings are used to distinguish similar objects, which are not necessarily used to describe the specific order or sequence. It is to be understood that the data so used are interchangeable under appropriate circumstances in order to describe the embodiments of the invention herein.

Unless otherwise stated, it should be noted that the terms "installed" and "connected" should be understood broadly. For example, "connected" could be fixed connection, detachable connection, integral connection, mechanical connection, electrical connection, direct connection, indirect connection through the intermediate structure, or internal connection between two elements. For those of ordinary skill in this field, the specific meanings of the above terms in the present invention can be understood in specific situations.

Hereinafter, embodiments of the present invention have been described in detail with reference to the accompanying drawings. While the description above refers to the particular embodiments of the present invention, it will be understood that many modifications may be made without departing from the spirit thereof. Any equivalent replacement or modification would fall within the protection scope of the present invention.

What is claimed is:

1. A display equipment fixing tray, comprising a clamping base (1) and a mounting base (2), wherein a counter bolt (3) is installed on the top of the clamping base (1), the other end of the counter bolt (3) is located inside the mounting base (2), a fixing tube (4) is fixedly installed on the side wall of the mounting base (2), a fixing hole (5) is opened on the inner wall of the fixing tube (4), the clamping base (1) is in an inverted concave shape, a mounting hole (6) is opened on the side wall of the clamping base (1), and a sleeve (7) is sleeved on the outer wall of the counter bolt (3), wherein an adjusting nut (8) is threadedly connected to the outer wall of the counter bolt (3), and the adjusting nut (8) is located on the inner top wall of the clamping base (1), wherein a first gasket (9) and a second gasket (10) are respectively installed at the upper and lower ends of the top of the clamping base (1), the top wall of the first gasket (9) abuts against the inner top wall of the clamping base (1), the bottom wall of the first gasket (9) abuts against the top wall of the adjusting nut (8), the top wall of the second gasket (10) abuts against the bottom wall of the sleeve (7), and the bottom wall of the second gasket (10) abuts against the upper surface of the top of the clamping base (1), and a third gasket (11) is installed on the bottom wall of the mounting base (2), and the bottom wall of the third gasket (11) abuts against the top wall of the sleeve (7), and wherein a mounting groove (13) is provided on the inner wall of the mounting base (2); a head (14) of the counter bolt (3) is located at the end of the counter bolt (3) away from the adjusting nut (8); a compression gasket (12) is installed at a lower portion of the head (14) of the counter bolt (3), and a bottom wall of the compression gasket (12) abuts against an inner bottom wall of the mounting groove (13).

* * * * *